J. Taggart,
Sawing Shingles.
N° 12,848.
Patented May 8, 1855.
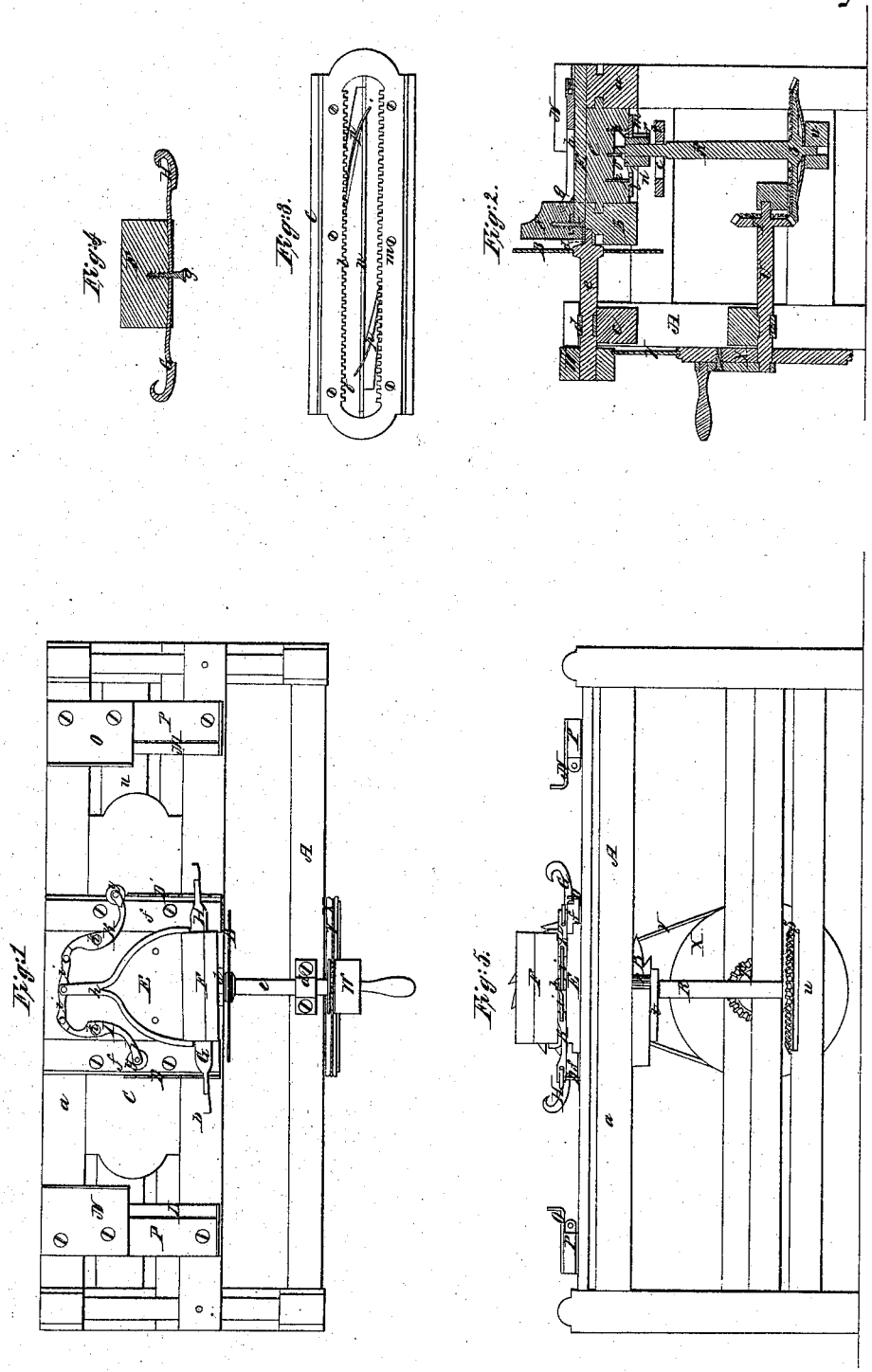

UNITED STATES PATENT OFFICE.

JOHN TAGGART, OF ROXBURY, MASSACHUSETTS, ASSIGNOR TO HIMSELF, AND NEHEMIAH HUNT, OF BOSTON, MASSACHUSETTS.

MACHINE FOR SAWING WEDGES OR SHINGLES.

Specification of Letters Patent No. 12,848, dated May 8, 1855.

*To all whom it may concern:*

Be it known that I, JOHN TAGGART, of Roxbury, in the county of Norfolk and State of Massachusetts, have invented a new and useful Improvement in Machinery for Sawing Wedges or Shingles from Blocks of Wood; and I do hereby declare that the same is fully described and represented in the following specification and the accompanying drawings, letters, figures, and references thereof.

Of the said drawings, Figure 1, denotes a top view or plan of a shingle machine constructed in accordance with my invention. Fig. 2, is a transverse, vertical and central section of it, taken through the shaft of its circular saw, said section also being taken through the carriage by which the bolt or piece of wood is moved up to the saw. Fig. 3, is an underside view of the main carriage and its toothed racks. Fig. 4, is a longitudinal section of the turning bearer and its spring lifter catches. Fig. 5, is a side elevation of the machine, it being taken so as to exhibit that side of it which is farthest from the circular saw.

In the drawings, A, represents the main frame of the machine; it having on its upper part, thin horizontal or parallel rails, $a$, $b$, $c$, two of which, viz; $b$ and $c$, support the boxes, $d$, $d$, of a horizontal shaft, $e$, which carries a circular saw B, arranged close against one side of the rail or timber, $b$. Between the two timbers or rails, $a$, $b$, and sustained by them, is the main carriage, C, which has machinery applied to it for imparting to it a reciprocating rectilinear motion in a direction parallel to the plane of the saw. Fixed to the top surface of the carriage, C, and so as to extend over the rails $a$, $b$, and parallel to each other are guide rails, $f$, $f$, each of which supports a notched rack D, or D,' arranged upon it as seen in Fig. 1. The said rails, $f$, $f$, serve to guide toward the saw and to keep in place on the carriage, C, a second carriage, F, which should be capable of sliding freely between such rails and either toward or away from the saw.

On the upper surface of the carriage, and close to that end of it which is nearest to the saw, there is arranged what may be termed the "turning bearer," F, (see Fig. 2) it having a pivot or pin, $g$, extending from it and into the carriage, E, and this for the purpose of allowing the said bearer F to be turned horizontally on the carriage. This bearer carries a lever formed with two spring lifter catches, G, H, such lever being applied to it, as seen in Figs. 1, and 4; and from said bearer there extends backward an arm, $h$, that is connected to two curved levers, I, K, by joint links $i$ $i$, such levers turning respectively upon fulcrums $k$, $k$, extended up from the carriage, E. The said levers, I, K, and the lifter catches, G, H, operate in connection with stationary lifters, L, M, and stationary rails or plates, N, O, affixed to two cross bars, P, P, as seen in Fig. 1, the said cross bars being arranged upon the timbers $a$, $b$, and with a saw between them as seen in Figs. 1, and 5.

The machinery by which reciprocating longitudinal movements are imparted to the main carriage, C, may be described as follows. To the underside of the carriage two toothed racks $l$, $m$, are arranged as seen in Figs. 2 and 3, such racks being placed on opposite sides of a guide rail, $n$, made to project downward from the middle of the carriage and into a groove or space, $o$, extending lengthwise throughout the carriage. Two springs, $p$, $p$, are affixed to the opposite sides of the space, $o$, and bear against the opposite ends of the guide rails—as seen in Fig. 3. On an upright shaft R is a pinion, $r$, adapted to operate in either of the racks, $l$, $m$. The upper end of the shaft or that part of it which extends above the pinion rests against the guide rail, $n$, while the shaft immediately below the pinion is supported in a plate, $t$, or in a slot, $x$, formed through the said plate in such manner as to allow the shaft to be moved so as to carry the pinion from one rack over to the other. The lower end of the shaft R is pivoted on a stationary rail, $u$, and there is affixed upon such shaft and near the lower end of it a beveled gear S, which engages with a beveled pinion, T, fixed upon a horizontal shaft, U. Rotary motion is communicated to such shaft U, by means of an endless band, V, made not only to pass around the driving drum or pulley, W, of the saw shaft, but also around a pulley X, fixed upon the shaft, U.

During the rotations of the pinion, $r$, the main carriage, C, will be moved longitudinally in one direction until one of the springs, $p$, $p$, acting against the upper part of the shaft R, throws said shaft R, by the adjacent end of the rail, n, and so as to force the pinion into gear with that toothed rack (l or m) which is opposite to the one out of which the pinion may have been moved by the spring. The rotary motion of the pinion continuing, the main carriage will receive motion in a direction opposite to that in which it had just previously been moved.

The stationary lifters, L, M, heretofore mentioned are rollers so applied to their cross bars, P, P, that whenever, a lifter catch, G, or H, is carried into contact with either of them, it, (the said roller) shall force or raise said catch upward far enough to elevate it entirely out of, or entirely above its notched rack D, or D′, and this before the adjacent lever (I, or K) is moved into contact with the rail next to it, (viz, N, or O). Each of said levers carries a friction roller, y, as seen in Fig. 1, and when the roller is forced into contact with the rail, N, or O, against which it may be moving, its lever will be turned on its fulcrum so as to draw toward it the arm, h, and thereby turn the bearer F, so as to move the raised lifter catch directly over the next notch of its notched rack, and this while the other lifter catch remains in a notch in the other notched rack.

The operation just described naturally produces a slight forward movement of the carriage E, or feeds it up to the saw at the saw at the same time causing the bearer F to be turned horizontally.

From the above it will be seen that if the bolt or block from which the shingles are to be sawed and which is made to rest against the front edge of the bearer is dogged or fastened to the bearer, the said block will not only be turned or vibrated with the bearer but will be moved forward with it in such manner as to cause the saw during each horizontal movement of the carriage C, to cut from such block a wedge or shingle and in so doing to commence the cut at the thinnest edge of the wedge and terminate it at the thickest or butt end of it.

My machine by means of the above described mechanism becomes automatic, or continue to move forward and adjust the bolt and cut it into shingles until it is entirely reduced thereto and this without any attendance, after the bolt or block has once been fixed to the bearer, F.

What I claim as my invention is—

The peculiar combination of mechanism employed for moving the bolt forward and changing its position so that a shingle or wedge shall be removed from it by the saw during each longitudinal movement of the bolt produced by the main carriage, the said combination consisting of the carriage, E, the turning bearer, F, its lifting catches G, H, the notched racks D, D′, the two levers, I, K, the stationary lifters L, M, and the stationary rails, N, O, the whole being combined with the main reciprocating carriage and the frame of the machine, and made to operate together and with the circular saw substantially as specified.

In testimony whereof, I have hereunto set my signature this second day of January A. D. 1855.

JOHN TAGGART.

Witnesses:
R. H. EDDY,
F. P. HALE, Jr.